United States Patent
Millsap et al.

(10) Patent No.: US 6,522,962 B2
(45) Date of Patent: Feb. 18, 2003

(54) DISTRIBUTED CONTROL ARCHITECTURE FOR MECHATRONIC AUTOMOTIVE SYSTEMS

(75) Inventors: Scott A. Millsap, Saginaw, MI (US); Stephen Vincent Gillman, Bay City, MI (US); Karen Ann Boswell, Freeland, MI (US); Frederick J. Berg, Auburn, MI (US); James M Petrowski, Saginaw, MI (US); Ratko Menjak, Frankenmuth, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/858,236

(22) Filed: May 15, 2001

(65) Prior Publication Data

US 2002/0026268 A1 Feb. 28, 2002

Related U.S. Application Data

(60) Provisional application No. 60/227,744, filed on Aug. 24, 2000.

(51) Int. Cl.[7] .................................................. B62D 5/04
(52) U.S. Cl. ......................................... 701/41; 180/443
(58) Field of Search ..................... 701/41, 48; 180/443; 3074/10.1

(56) References Cited

U.S. PATENT DOCUMENTS

| | | | |
|---|---|---|---|
| 4,621,327 A | 11/1986 | Dolph et al. | |
| 4,741,409 A | * 5/1988 | Westercamp et al. | 180/402 |
| 5,445,239 A | * 8/1995 | Miller et al. | 180/422 |
| 5,762,162 A | 6/1998 | Bodtker et al. | |
| 5,906,250 A | 5/1999 | Haga et al. | |

* cited by examiner

Primary Examiner—Michael J. Zanelli
(74) Attorney, Agent, or Firm—Edmund P. Anderson

(57) ABSTRACT

A chassis control network architecture having an electronic control module mountable on a steering column subassembly is disclosed. A first communications bus is connected to the electronic control module and an actuator control module is in communication with the electronic control module, through the first communications bus. The actuator control module is further connected to an electric steering motor, and is capable of receiving a steering input command from the electronic control module and applying it to the electric steering motor.

15 Claims, 5 Drawing Sheets

DISTRIBUTED CONTROL ARCHITECTURE FOR MECHATRONIC AUTOMOTIVE SYSTEMS

CROSS REFERENCE TO RELATED APPLICATIONS

This application claims the benefit of U.S. provisional patent application Ser. No. 60/227,744, filed Aug. 24, 2000, the entire contents of which are incorporated herein by reference.

TECHNICAL FIELD

The present invention relates to electric power steering systems for automobiles, and, more particularly, to a distributed control architecture for electric steering systems.

BACKGROUND OF THE INVENTION

Electric power steering systems currently known in the art generally include, among other things, such components such as: torque and position sensing mechanisms, electronic control mechanisms, electric steering motors, mechanical reduction gearing and wiring, all of which are typically located within a steering column assembly. While these steering control systems may be characterized as modular, centralized or self-contained, they do not easily lend themselves to future development of electric steering systems as part of an overall total chassis control system, in which other chassis subsystems may be interconnected and controlled through a communications bus.

Electric steering system products are capable of sharing only limited amounts of information. Furthermore, the electric steering systems are not easily functionally integrated with non-chassis systems such as a global positioning system (GPS) or a multimedia system.

SUMMARY OF THE INVENTION

The above identified drawbacks of the prior art are alleviated by the invention described herein. In one embodiment, a chassis control network architecture has an electronic control module mountable on a steering column subassembly. A first communications bus is connected to the electronic control module and an actuator control module is in communication with the electronic control module, through the first communications bus. The actuator control module is further connected to an electric steering motor, and is capable of receiving a steering input command from the electronic control module and applying it to the electric steering motor.

In a preferred embodiment, the first communications bus provides data interface between motor vehicle chassis systems and the second communications bus provides data interface between non-chassis systems.

BRIEF DESCRIPTION OF THE DRAWINGS

Referring now to the drawings wherein like elements are numbered alike in the several Figures.

DETAILED DESCRIPTION OF THE INVENTION

Figure 1:
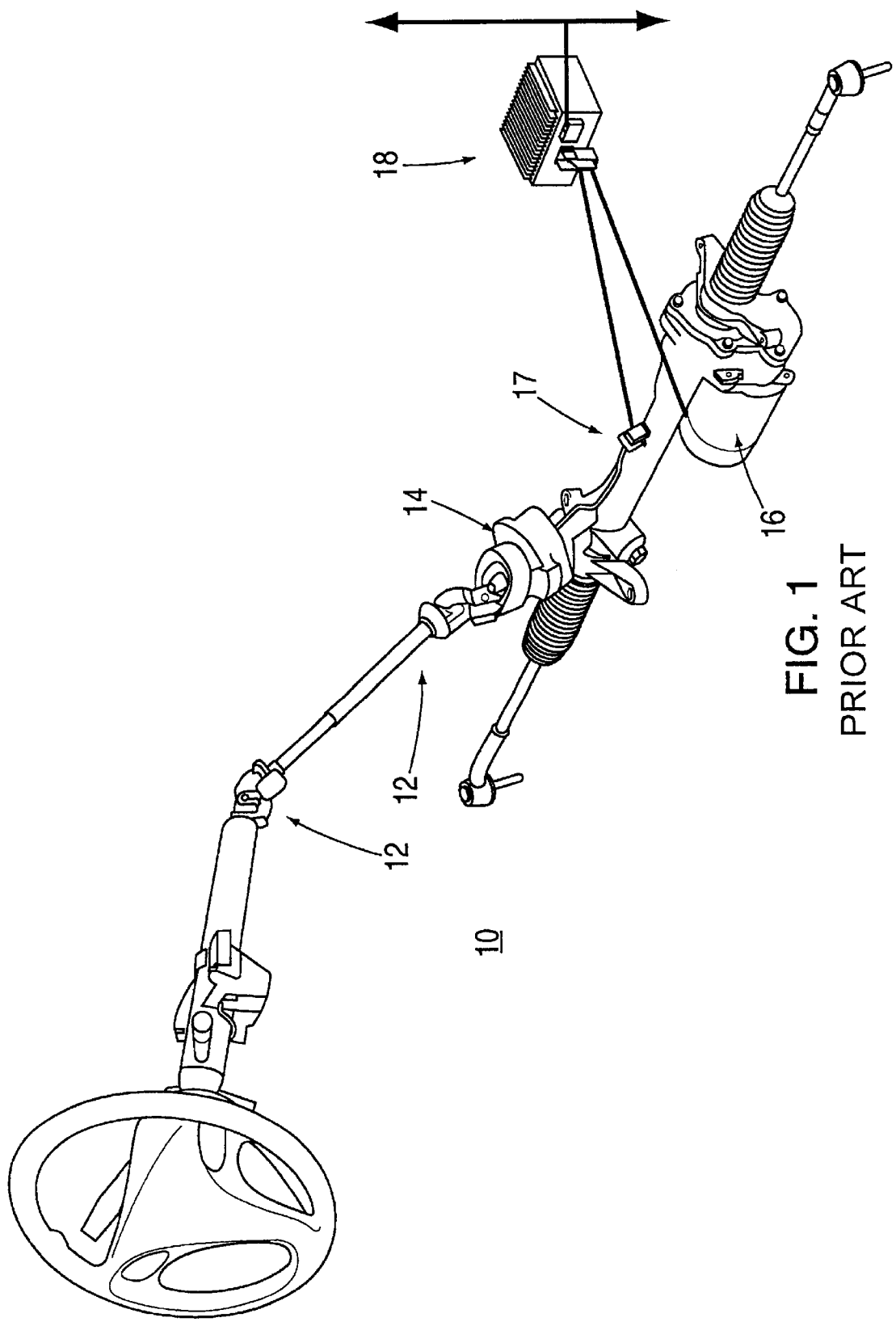
FIG. 1 is a perspective view of an existing control architecture for an automotive steering system.

Refering initially to FIG. 1, an architecture 10 for an existing electric power steering control system (rack assist) is shown. It should be pointed out that although FIG. 1 depicts a system utilizing "rack assist" electric power steering, both the prior art architecture 10 and the architecture of the embodiments of present invention are applicable to other types of steering systems, including column assist, front actively controlled steering and rear wheel electric steering (4WS system). The prior art architecture 10 is based on a centralized control structure, in that all of the major components used therein to accomplish the power steering assist are incorporated onto the rack and pinion assembly 12 itself. These components typically include: integrated torque and position sensors 14, an electric steering motor 16, mechanical reduction gearing (included internally within rack 17), an electronic controller 18, and a wiring harness (not shown).

Figure 2:
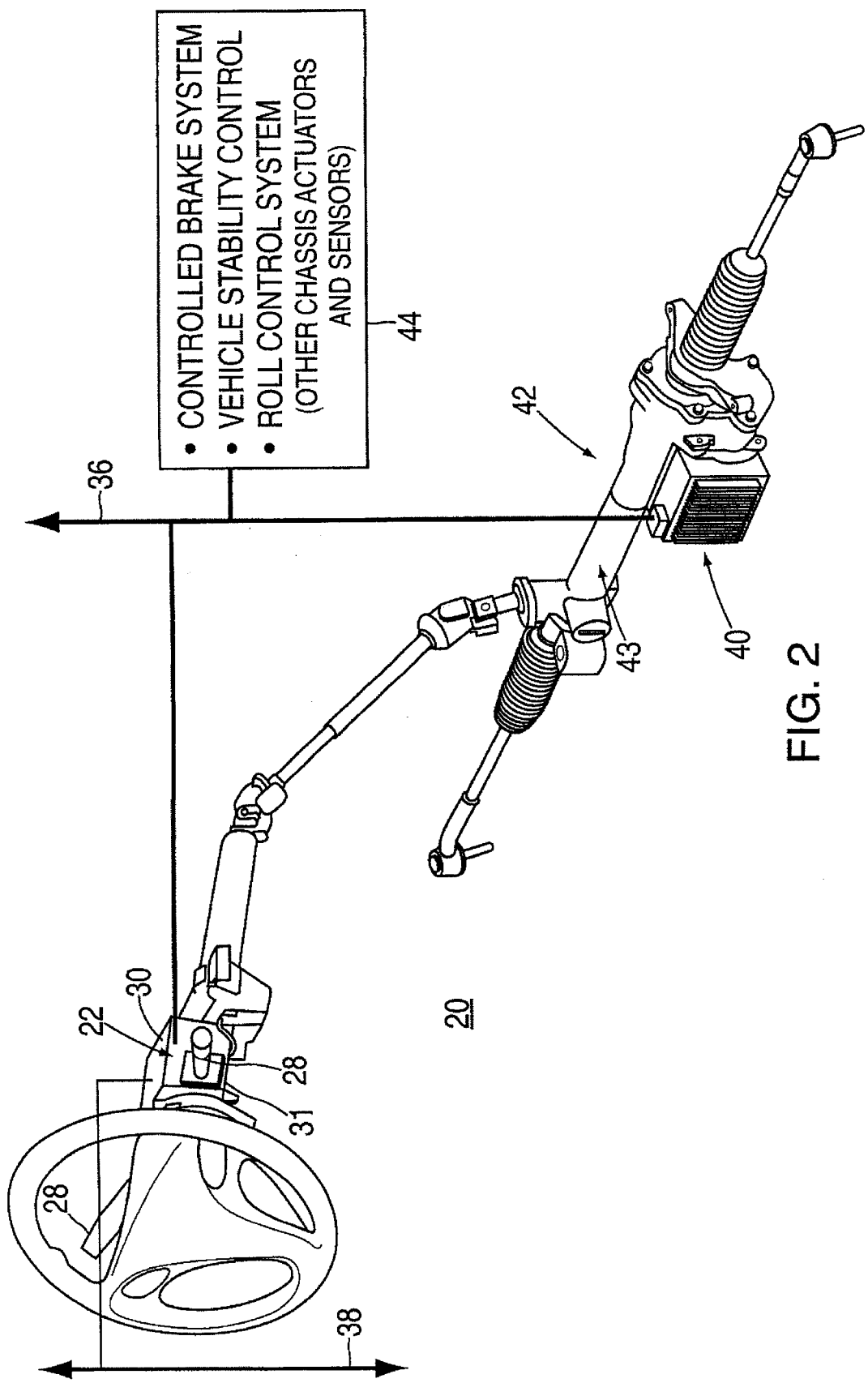
FIG. 2 is a perspective view of a distributed control architecture for an automotive steering system, illustrating the redistribution of system components according to an embodiment of the invention.
Figure 6:
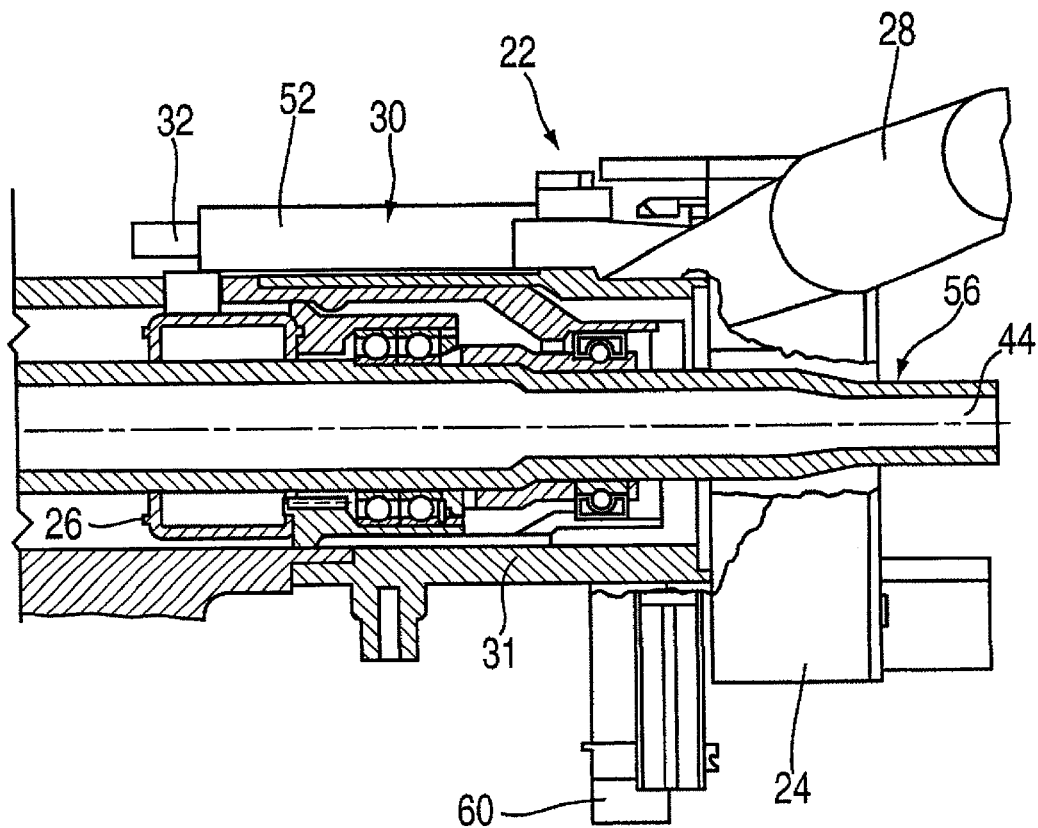
FIG. 6 is a side sectional view of the networked control assembly positioned on an upper steering shaft assembly.

Referring now to FIG. 2, the major elements of a chassis control network 20, in an embodiment of the invention, as part of a distributed control architecture are shown. Again, in this embodiment, the network 20 architecture is shown in its application to a rack assist steering system, but is equally applicable to other modes of assisted steering. Network 20 includes a networked control assembly 22, having a steering position sensor 24 and a steering wheel torque sensor 26 (both shown in FIG. 6), multi-function stalk switches 28 and controls, an airbag coil or equivalent interface (not shown) for connection to a steering wheel airbag, and an electronic control module 30. Additional details regarding the electronic control module 30 are disclosed in U.S. Provisional Application No. 60/185,603, the entire contents of which are incorporated herein by reference. The networked control assembly 22 is preferably located on an upper steering shaft housing 31.

Figure 4A:
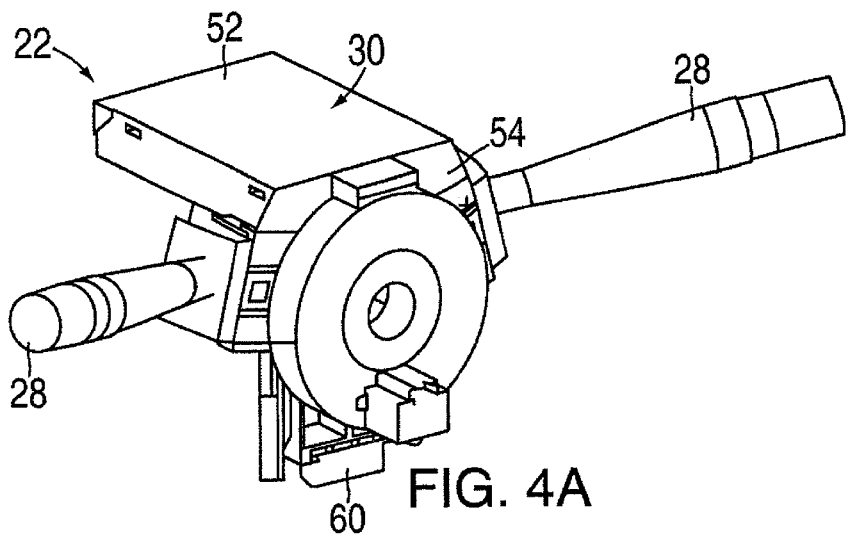
FIG. 4A is a perspective view of a networked control assembly for a power steering system, shown positioned on an upper steering shaft assembly.
Figure 4B:
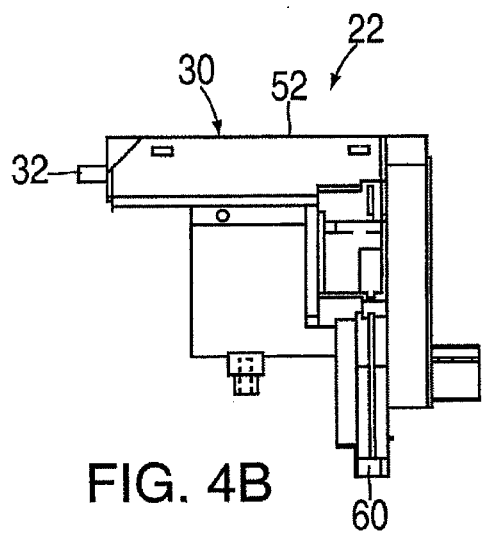
FIG. 4B is a side view of the networked control assembly, shown without the column stalk switches.
Figure 4C:
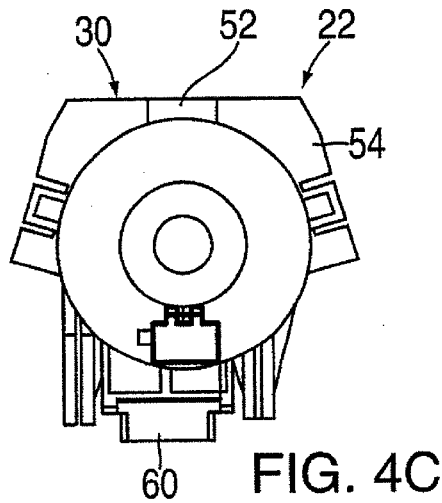
FIG. 4C is an end view of FIG. 3B.
Figure 4D:
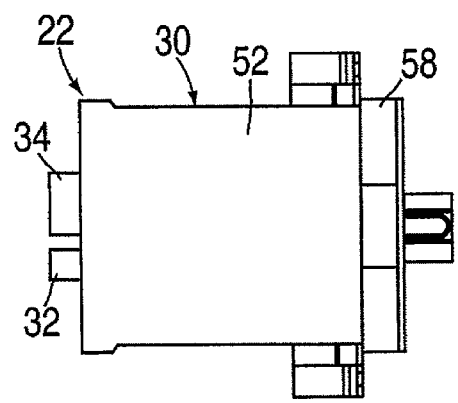
FIG. 4D is a top view of FIG. 3B.
Figure 5:
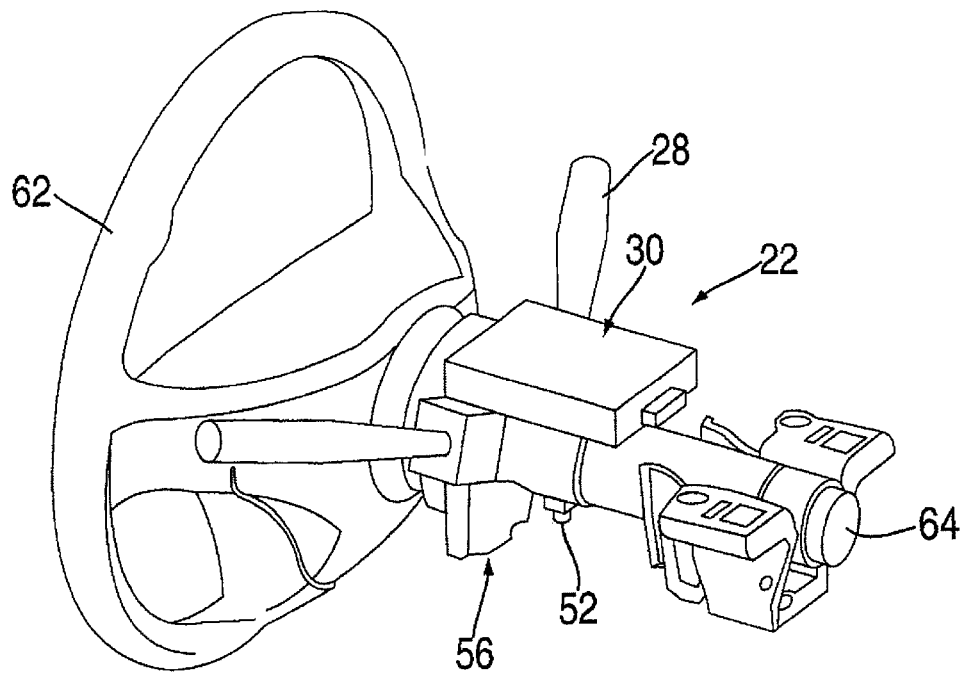
FIG. 5 is another perspective view of a networked control assembly for a power steering system, shown positioned on an upper steering shaft assembly, steering shaft and steering wheel.

The electronic control module 30, which will be described in greater detail hereinafter, further includes two separate communications interfaces 32, 34 (shown more particularly in FIG. 4D), for a first communications bus 36, and a second communications bus 38, respectively. First communications bus 36, in addition to interfacing with the other components in the power steering system, is also designed to provide communications with other vehicle chassis systems, such as braking and suspension. First communications bus 36 is further designed to provide dependable data and receiving and transmitting capability in the presence of bus component faults and/or faults on any subsystems connected to the bus. The second communications bus 38 provides interface and data exchange with non-chassis systems such as the main electrical system, vehicle diagnostics, and multi-media systems.

Network 20 further includes an actuator control module 40 having a DC brushless motor (inclusive to rack 42) located therein with control electronics, sensors, and wiring (not shown) used to commutate and control the torque output and angular motion of the motor, and to diagnose the proper operation of the motor. The control electronics and wiring receive and transmit data to and from electronic control module 30 through first communications bus 36. The electronic control module 30 computes the position command in response to input from the torque 26 and position 24 sensors, which position command is again transmitted via first communications bus 36 to the actuator control module 40. Upon receiving the position command signal from the electronic control module 30, the actuator control module 40 then applies this command to the motor. The motor, in turn, provides a power steering assist to rack 42 through steering assist assembly 43. The actuator control module 40 also performs diagnosis of its components therein to facilitate proper operation of the motor.

Finally, a placeholder 44 allows for expansion of other chassis control systems which may be connected to network 20 through first communications bus 36 as part of the overall distributed control system architecture. Such other chassis control systems may consist of brakes, active suspension, active roll, and vehicle state sensors including, but not limited to, yaw rate, lateral acceleration, and roll rate.

Figure 3:
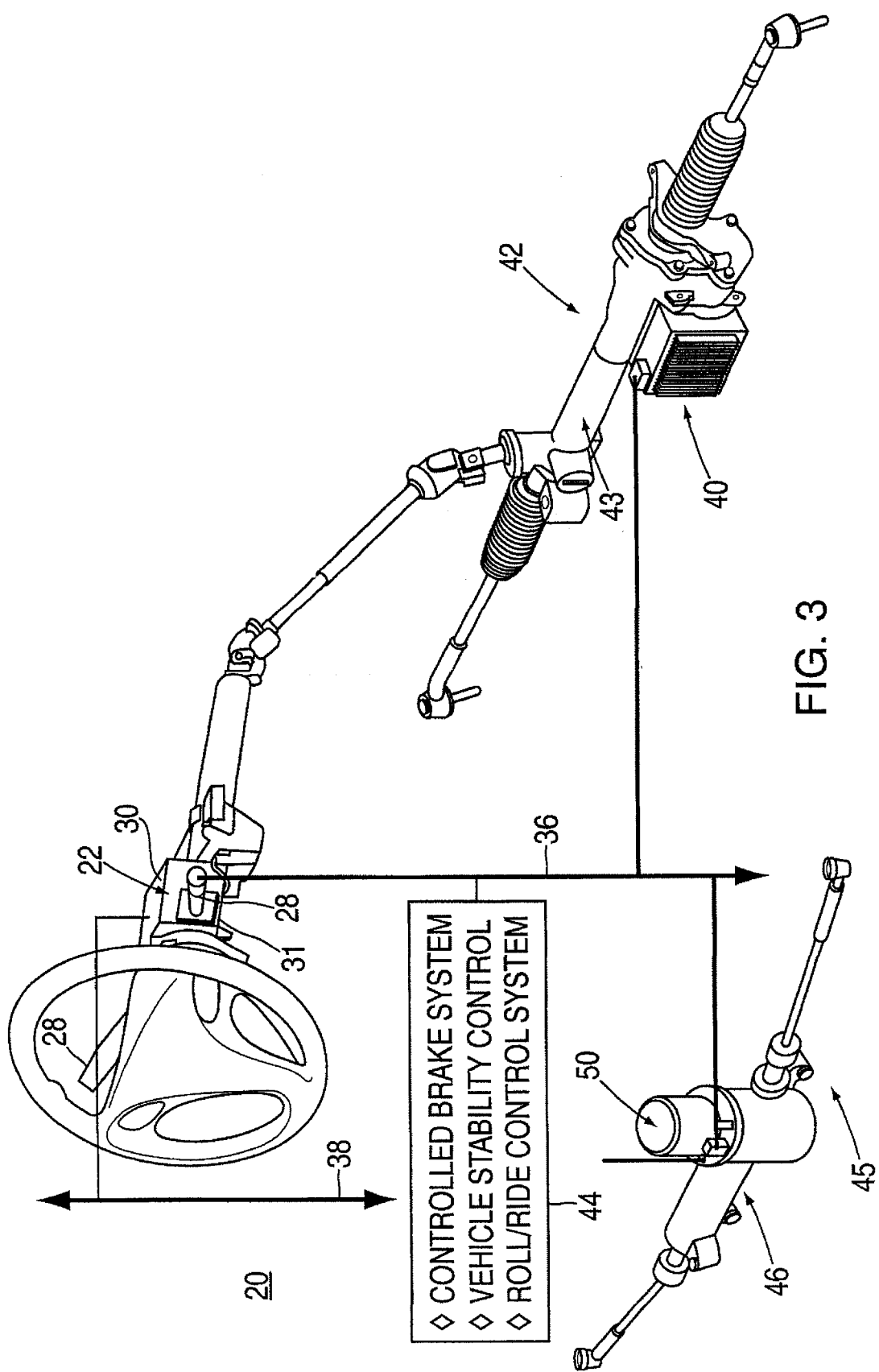
FIG. 3 is another embodiment of the distributed control architecture in FIG. 2.

FIG. 3 is an alternative embodiment of the steering network 20 shown in FIG. 2. In addition to providing an integrated electric power steering function at the front axle of a vehicle, the network 20 may also be implemented in a four-wheel steering system. First communications bus 36 also provides a communications interface to a rear vehicle axle 45 having a rear steering actuator assembly 46. As is the case with the front axle, the rear axle also features an integrated actuator control module 50 having a motor and motor control electronics (not shown) located therein. In a preferred embodiment, the rear steering actuator assembly comprises an electric steering, or "steer by wire" system.

Referring now to FIGS. 4A through 6, the electronic control module 30 of networked control assembly 22 integrates automobile steering column electronics into a common column node. Module 30 comprises a housing 52 and a bracket 54 for attachment to a steering column subassembly 56. The housing 52 has an internal printed circuit board containing circuitry for controlling vehicle functions. An optional hazard switch is also included therein.

Module 30 also features at least one integral column stalk switch 28, a clock spring coil 58, an optional sensor (not shown) within the printed circuit board, and an optional service diagnostic connector 60 for improved diagnostic capability. Thus configured, module 30 reduces the number of wires and connectors that run within steering column subassembly 56 down to an external bulkhead. The reduction in wires and connectors is achieved by the internal processing of turn signal indicators, radio features, ignition interlock, and other signals typically generated on the column.

The module 30 also provides a prime algorithm processing location for the functional integration of non-steering chassis systems and non-chassis related systems such as the Mobile Multi Media interface, in addition to such steering system algorithms Magnesteer, EPS, Front Active Steer, Four Wheel Steer, and the handwheel actuator for steer by wire. This is accomplished by utilizing package space from the steering wheel 62 and the column upper steering shaft 64 for processing vehicle and operator inputs, vehicle and operator control algorithm processing, and communication to other vehicle system control modules. The module 30 also has the capability to process algorithms from other sources, thereby decreasing the total number of algorithm processors/controllers in the automobile.

Applications of the present invention include, but are not limited to automotive, marine, construction, agricultural, industrial, aerospace, and applications that require a man-machine interface that will process information to and from the vehicle or operator.

The present invention described herein differs from the prior art described above in that the electrical control functions, including the steering angle and torque measurement sensors, are located directly at the steering wheel assembly, separate from the location for mechanical actuation. Positioned in this manner, the sensors 24, 26 need only conform to an 85° C. component tolerance specification and not a higher temperature specification (150° C.) associated with components located within the engine compartment, as in the prior art architecture.

Electric steering system network components, when composed within a distributed control architecture embodied by the present invention allow for an increased level of functional integration and operational coordination with other chassis control systems such as the brake system, active suspension, and electronic stability control. Separating the total chassis system control software onto a network of controllers provides an increased potential for system performance. The steering, braking, and suspension systems are coordinated control activities through the real time exchange of system data. The fault tolerant, first communication bus 36 allows for an efficient and dependable method of data exchange. In contrast, current electric steering products are only capable of sharing limited sensing information, since their chassis subsystems are not connected together via a fault tolerant communication bus.

An additional benefit for the distributed control architecture includes the ability to develop components that can be utilized with most, if not all of the electric components (i.e. system commonisation). This includes the module steering angle and torque sensors 24, 26, the hardware components of the first communications bus 36, and the portability and re-use of system software.

It will be understood that those skilled in the art may conceive variations and modifications to the preferred embodiment shown herein within the scope and intent of the claims. While the present invention has been described as carried out in a specific embodiment thereof, it is not intended to be limited thereby but is intended to cover the invention broadly within the scope and spirit of the claim.

What is claimed is:

1. A chassis control network architecture, comprising:
   an electronic control module mountable on a steering column subassembly;
   a first communications bus connected to said electronic control module; and
   an actuator control module in communication with said electronic control module, through said first communications bus, said actuator control module further connected to an electric steering motor;
   said actuator control module capable of receiving a steering input command from said electronic control module and applying said command to said electric steering motor.

2. The chassis control network architecture of claim 1, further comprising a second communications bus in communication with said electronic control module.

3. The chassis control network architecture of claim 1, further comprising a steering torque sensor mountable on said steering column subassembly, said steering torque sensor providing, input to said electronic control module.

4. The chassis control network architecture of claim 1, further comprising a steering position sensor mountable on said steering column subassembly, said steering position sensor providing input to said electronic control module.

5. The chassis control network architecture of claim 2, wherein said first communications bus provides data interface between motor vehicle chassis systems and said second communications bus provides data interface between non-chassis systems.

6. A networked control assembly for an automobile electric steering system, comprising:
    an electronic control module mountable on a steering column subassembly, including:
        a bracket attached to the steering column subassembly;
        a housing attached to said bracket, and
        a printed circuit board within said housing; and
        a communications interface for data exchange with an electric steering motor.

7. The networked control assembly of claim 6, further comprising a steering torque sensor mountable on said steering column subassembly, said steering torque sensor providing input to said electronic control module.

8. The networked control assembly of claim 6, further comprising a steering position sensor mountable on said steering column subassembly, said steering position sensor providing input to said electronic control module.

9. The networked control assembly of claim 6, further comprising a diagnostic connector connected to said electronic control module.

10. The networked control assembly of claim 6, wherein said electronic control module further provides a location for processing algorithms, said module thereby providing an integrated algorithm processing capability for algorithms controlling both vehicle steering and non-steering systems.

11. The networked control assembly of claim 10, wherein said module further provides an integrated algorithm processing capability for algorithms controlling both vehicle chassis and non-chassis systems.

12. A vehicular steering control system, comprising:
    an electronic control module mounted on a steering column subassembly;
    an actuator control module in electronic communication with said electronic control module, said actuator control module further connected to an electric steering motor;
    said actuator control module being capable of receiving a steering input command from said electronic control module and applying said command to said electric steering motor.

13. The vehicular steering control system of claim 12, further comprising:
    a steering torque sensor on said steering column subassembly, said steering torque sensor providing input to said electronic control module.

14. The vehicular steering control system of claim 12 further comprising a steering position sensor on said steering column subassembly, said steering position sensor providing input to said electronic control module.

15. The vehicular steering control system of claim 12, said electronic control module also facilitating communication between a driver interface and non-chassis systems.

* * * * *